United States Patent [19]

Shankle et al.

[11] Patent Number: 4,981,186
[45] Date of Patent: Jan. 1, 1991

[54] TRUCK LOAD WEIGHING METHOD AND APPARATUS

[75] Inventors: Glenn A. Shankle, Kilgore; Dwight Baker, Longview; Richard D. Baney, Longview; Paul L. Kelsey, Longview; Erwin F. Stoldt, Longview, all of Tex.

[73] Assignee: Marathon LeTourneau Company, Del.

[21] Appl. No.: 420,591

[22] Filed: Oct. 12, 1989

[51] Int. Cl.⁵ ............................................. G01G 19/10
[52] U.S. Cl. ........................................ 177/141; 177/1
[58] Field of Search .................................. 177/141, 1

[56] References Cited

U.S. PATENT DOCUMENTS 4,691,792  9/1987  Shintani .......................... 177/141 X
4,831,539  5/1989  Hagenbuch .
4,839,835  6/1989  Hagenbuch .

Primary Examiner—George H. Miller, Jr.
Attorney, Agent, or Firm—Vinson & Elkins

[57] ABSTRACT

A method and apparatus for load weight determination of the truck including the steps of loading the truck, sensing the pressure of the tilting cylinders to determine the amount of load, indicating the load weight, providing feedback on the affect of variations in the center of gravity of load to correct the load weight determined and providing a corrected load weight. The apparatus includes a tilting bed truck with the bed hinged to the truck frame and tilted to its dumping position by tilting cylinders, a sensing device for sensing the pressure in the tilting cylinders when they are supporting the bed above its support pad, a data processor having data on truck loading and receiving information on the pressure sensed by the sensing device and having an output to indicating devices of the load weight.

18 Claims, 4 Drawing Sheets

TRUCK LOAD WEIGHING METHOD AND APPARATUS

BACKGROUND

The present invention relates to a method of an apparatus for determining the load carried by large trucks. Such trucks are commonly used in open pit mining.

Truck loading systems have been used in the past for trucks which carry very heavy loads. Such systems are used to determine the load being carried so that the trucks are not overloaded and so that the amount of material being moved by a fleet of such trucks is known.

U.S. Pat. No. 4,831,539 discloses a method and apparatus for a complete system which provides communication from the trucks and a central station so that there is a continuing and complete record of the material loaded and moved by the trucks and the location to which the material was taken and dumped. The weighing apparatus includes fluid filled tubing which is substituted for the cushioning support materials added along the length of the parallel beams of the frame. The fluid filled tubing combined with pressure sensors provides the desired weight indication of the load carried by the truck.

U.S. Pat. No. 4,839,835 discloses a similar fluid filled tubing between the beams and the frame to coact with pressure sensors to provide the desired weight. This patent contains a discussion of the prior attempts at load weighing and the problems encountered by the pivotal connection between the frame and the truck bed and the disadvantages of the concentration of the load on the frame by the use of load sensors which are incorporated into the hinge assemblies and the hydraulic. One of these problems is recited to be, the structural integrity of the truck may be degraded by modifications of the hinge assemblies and hydraulic cylinders required to incorporate the loads sensors.

Load measurements on front end loaders have been made by measuring the pressure in the hydraulic cylinders used to carry the load for the structure. In such case the hydraulic cylinders reflect the total load carried and not just a portion of the load as is the case in the usual tilting bed truck.

SUMMARY

The present invention relates to an improved method and apparatus for determining the load being carried by a tilt bed type of truck. The bed tilting hydraulic cylinders are utilized by monitoring the pressure loading which is an indication of the amount of the load in the bed when it is corrected by a factor which takes into account the amount of the load carried by the hinges and the general load distribution within the bed.

An object of the present invention is to provide an improved method and apparatus for determining the weight of a load carried by a tilt bed type of truck which is simple in construction and reliable in operation.

Another object is to provide an improved method and apparatus for determining the weight of a load in a tilt bed type of truck which provides a reliable indication of the weight of the load as it is being loaded so that the truck is not overloaded.

A further object of the present invention is to provide an improved method and apparatus for determining the weight of a load in a tilt bed type of truck in which the load sensing equipment can be protected from the shock loading of the load material being dumped into the truck bed.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figures 1, 2:
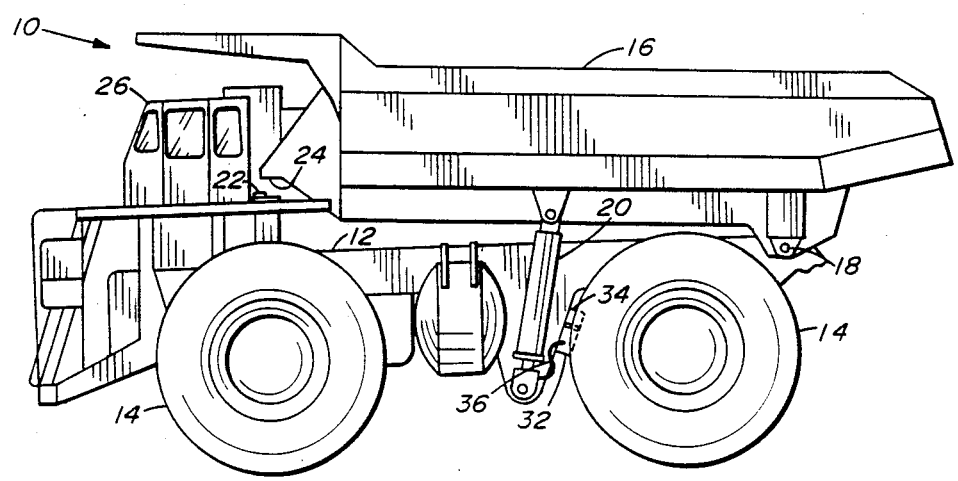
FIG. 1 is a side elevation view of a tilt bed type of heavy truck to which the present invention has application with the truck having its bed slightly raised by the tilting cylinders to allow the weight of the load in the bed to be sensed.
FIG. 2 is a detail side elevation view of the tilt bed and its bumber or stop on the frame which it engages when the tilt cylinders are fully retracted.

Truck 10 illustrated in the drawings is a typical haulage truck which has a large capacity for carrying solid material such as ore. The truck has a frame 12 supported on the wheels 14 and a tilting bed 16 which is pivotally supported from frame 12 by hinge 18 at a position below bed 16 near its rear end and by tilting cylinders 20 which engage beneath bed 16 at a position spaced a substantial distance from the rear end of bed 16 as shown. As shown in FIGS. 1 AND 2, frame 12 carries support 22 which is positioned to receive the lower stop portion 24 of bed 16 positioned thereon during normal operations except as otherwise specified.

Figure 3:
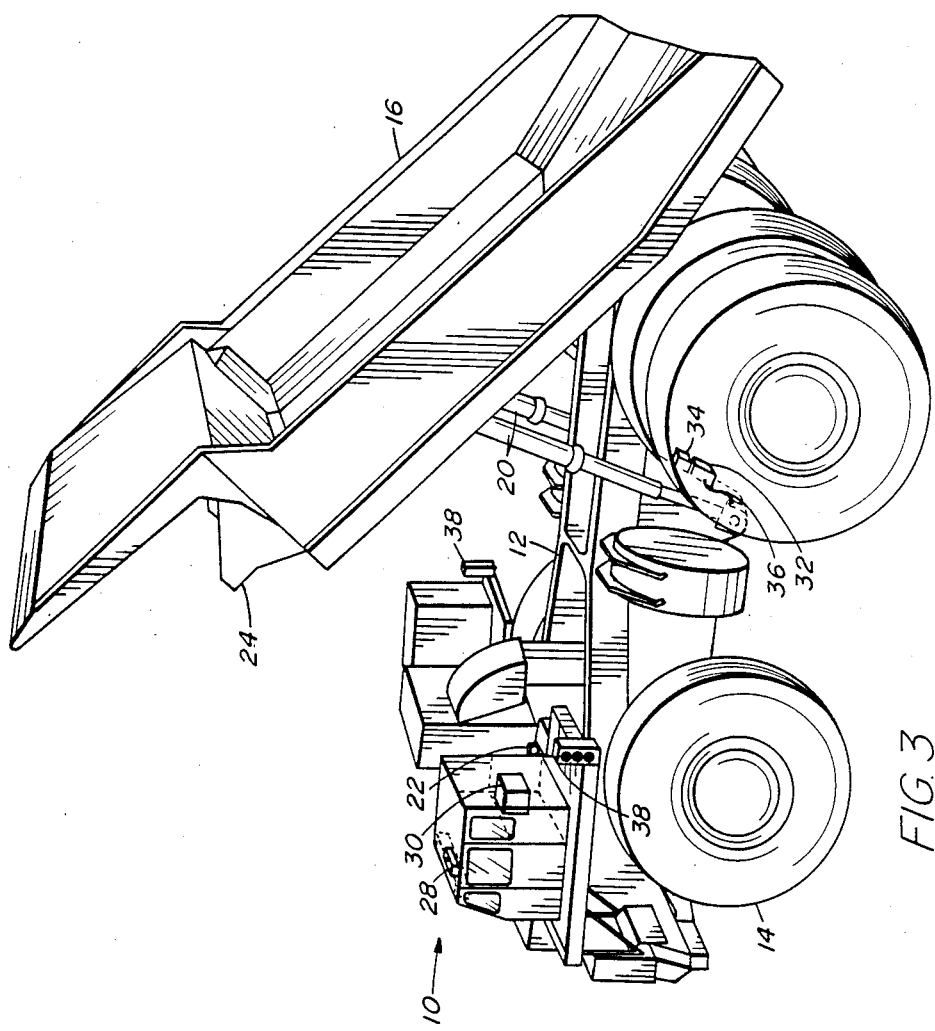
FIG. 3 is a an isometric view of the same truck with its bed shown in its tilted position and the components of the present invention being shown in their relative position with respect to the truck.
Figure 4:
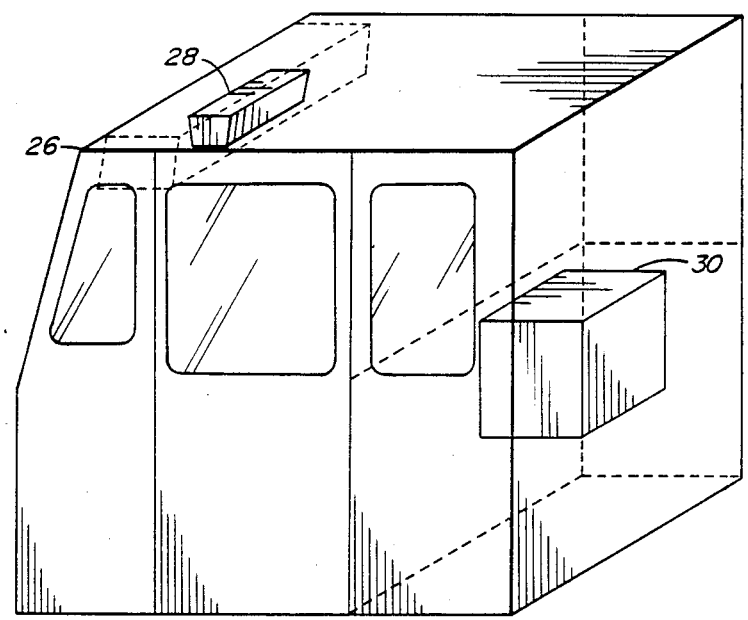
FIG. 4 is a detail, partial isometric view of the cab of the truck and illustrating typical positions of the driver weight indicator and the processor which provides the computation of the weight to feed to the driver weight indicator and the loading operator lights.

Truck 10 is operated by the driver who is positioned in cab 26 and weight indicator 28 is provided within cab 26 at a convenient position for the driver to be able to see the reading of the weight indicator 28. Data processor 30 is provided in the cab at a location which does not interfere with the operator's functions. Weight indicator 28 and data processor 30 are shown in FIGS. 3 and 4.

Figure 6:
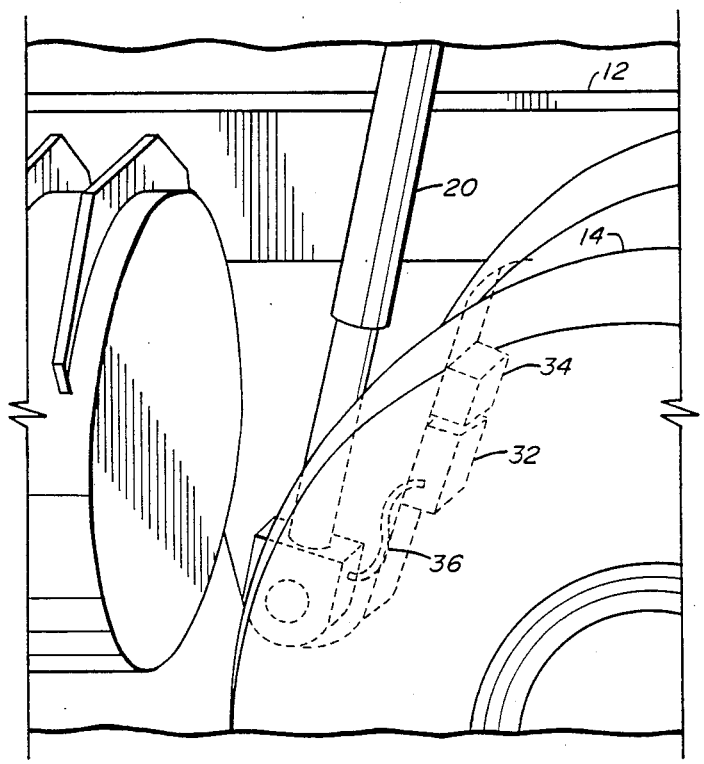
FIG. 6 is a partial detail isometric view of the hydraulic system and load weight sensing system used in conjunction with the tilting cylinder on one side of the truck.

Suitable conditioning apparatus 32, such as an accumulator, and sensing device 34 are provided in connection with line 36 which supplies hydraulic fluid under pressure to tilting cylinders 20. Sensing device 34 is connected in line 36 so that it can sense the amount of pressure which develops in tilting cylinders 20 as they lift bed 16 with the load therein. This apparatus is shown in FIGS. 3 AND 6.

Figure 5:
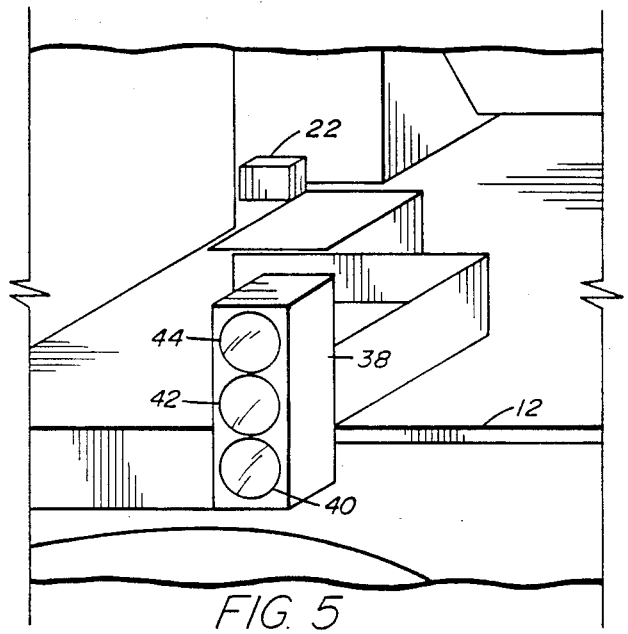
FIG. 5 is a detail, partial isometric view of the loading operator lights on one side of the truck cab.

At times it may be desired to provide an indication for the operator who is loading the trucking bed of the amount of weight already in the truck bed. This can be done by signal lights 38 which are positioned at a suitable location so easy view by the loading operator such at opposite sides of truck 10 at a position near the rear of each side of cab 26 as shown in FIG. 3. The particular detail of signal lights 38 is shown in greater detail in FIG. 5, wherein signal light 38 is shown supported from frame 12 at a position behind cab 26 and includes three lights, lower green light 40, intermediate amber light 42 and upper red light 44. Green light 40 is used to indicate that the sensed load is substantially less than the maximum allowed load weight. Amber light 42 provides an indication that load weight is approaching the maximum desired load weight and red light 44 indicates that the maximum load weight has been reached and that loading should be stopped.

Sensing device 34, weight indicator 28 and signal lights 38 are connected to data processor 30 which processes data from sensing device 34 and data previously stored therein and provides suitable output to weight indicator 28 and signal lights 38. Additionally, data processor 30 may be provided with other refinements, such as a radio link, to provide and receive data to and from a central location as hereinafter discussed more fully. Further, it is possible for the operator of truck 10 to be able to provide input data to data processor 30. Suitable wiring is provided to make the necessary connection between data processor 30 and the other components as described.

In operation, after the improved weight determining apparatus of the present invention has been installed on truck 10, truck 10 is driven to a loading area where a suitable loading device delivers ore or other material to be transported by truck 10 into bed 16. Normally, it is preferred for bed 16 to be supported by hinge 18 and support pad 22 during the loading to protect tilting cylinders 20 and their associated hydraulic systems from the shock of the load being dropped onto the bed. This may be accomplished by lowering bed 16 into engagement with support pad 22 prior to the dropping of the first load portion therein, the lifting bed 16 with tilting cylinders 20 a short distance to provide a load indication to date processor 30 and then again lowering onto support pad 22 before the next load is dropped. This provide a continuing indication of the amount of load delivered to bed 16 to the truck operator by weight indicator 28 and to the loading operator by signal lights 38. While, not normally desirable, bed 16 may remain in its slightly tilted position shown in FIG. 1 to provide a continuing reading of the load weight in bed 16. It is suggested that when providing a continuing indication to the truck operator during loading that the indicator be provided during initial loading to indicate only that less than a minimum amount of load has been reached since the load weight system is particularly subject to providing an incorrect reading during initial loading because the load distribution along the bed may provide an indication that little load has been added or that much more load has been added depending on where the load has been placed in bed 16. Such false load indication may cause the truck operator to distrust the reading and turn off the unit when he knows the reading does not correctly reflect the amount of load which has been added according to his personal experience.

Another method of operating the system is to provide only a final check of the load after loading is completed. This may be done prior to the moving of the truck from the loading zone or, if desired, at the point of discharge of the load. This may be accomplished at the dumping location by providing a sensing of the load when the tilting cylinders are at their desired extended position at which load readings are to be taken. When the load readings are taken at the time of dumping, they are provided to the loading operator so that if the material which is being loaded has varied in weight per volume, that is a full shovel, or other loading device, is much heavier or lighter, the load weight will provide such operator with an indication that he does not need to use as many loads to completely load the truck or he should add more loads to completely load the truck.

It should be noted that load reading can be taken at two different positions of extension of tilting cylinders 20. By taking the reading with cylinders extended the minimum amount and also extended substantially more than the minimum amount an indication of the center of gravity of the load and thereby provide a correct load weight reading. Another step which can be taken to provide improved accuracy of the load weight is to subject truck 10 after loading to weighing and providing this information to processor 30 as a way in which weight data may be corrected in the future to compensate for variations of the center of gravity of the load at the time of sensing.

Figure 7:
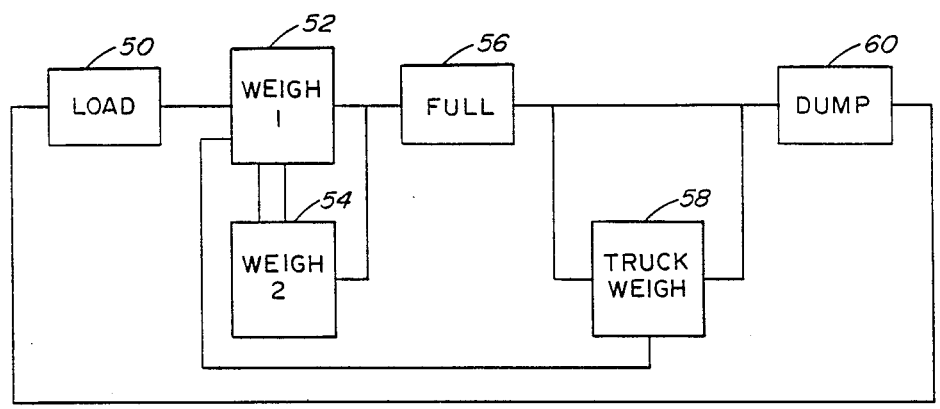
FIG. 7 is a schematic block diagram of the steps taken to perform the method of the present invention.

The steps of operating the system of the present invention are illustrated schematically in FIG. 7. The loading step 50 is the first step at which the truck 10 is positioned in the loading zone and a suitable loading apparatus, such as a drag line or other loading device, picks up the material, such as ore, and delivers it to the bed 16 of truck 10. Step 52 is the second step and includes the sensing and indicating the load in the truck bed. Step 54 is a secondary indicating step in which a separate sensing and indicating step is provided with the alternate position of the tilting cylinders 20. This secondary indicating step 54 provides a feedback to data processor 30 correcting the load weight determination. Step 56 indicates the departure of the truck from the loading zone and it proceeds to step 58 for an actual weighing of the truck and its load for feedback correction to the initial load weight determination when the secondary step 54 has not been included. Step 60 is the dumping of the load and the truck returns to the loading zone.

What is claimed is:

1. An apparatus for determining the load received by a truck comprising
   a truck having a frame, a cab, a bed, means for pivotally connecting the bed to the frame, tilting cylinders for tilting the bed with respect to the frame, means for moving the truck and an on-board processor carried by the truck,
   means sensing the pressure within the tilting cylinders,
   means supplying the sensed pressure from the tilting cylinders to the on-board processor
   an initial correction factor set in the on-board processor for converting the tilting cylinder pressures to a first load weight,
   means for adjusting said initial correction factor,
   means for supplying the adjusted correction factor to the on-board processor for use with the pressure sensed from the tilting cylinders to provide a correct load weight, and
   means on the truck providing an indication of the corrected load weight determined by the processor.

2. An apparatus according to claim 1 wherein said weight indication means includes a direct weight indicating device in the cab of said truck.

3. An apparatus according to claim 1 wherein said weight indication means includes
external lights which provide an indication of the approach and reaching of the maximum load weight.

4. An apparatus according to claim 1 wherein said means for adjusting the initial correction factor includes means for weighing the loaded truck, and
means for supplying the loaded truck weight to the on-board processor to change the initial correction factor.

5. An apparatus according to claim 1 wherein said means for adjusting the initial correction includes
at least two preselected positions for the tilting cylinders at which pressure sensing of the cylinder pressure may be made, and
means for supplying the data from the pressure sensing at the two preselected positions of the tilting cylinders to the on-board processor to adjust the initial correction factor.

6. The method of determining the weight of a load material carried in the bed of a tilting bed truck of the type having its bed pivotally attached to the truck frame by a hinge and controlled by tilting cylinders, said method comprising the steps of:
loading the truck with a material to be hauled,
extending the tilting cylinders sufficiently to support the truck bed on the tilting cylinders and hinge and free of direct support by the truck frame,
measuring the pressure of the hydraulic fluid within the tilting cylinders,
supplying an indication of the measured pressure to a processor,
calculating, with the processor, a first load weight of the material in the truck bed by utilizing the measured pressure of the fluid in the tilting cylinders and an initial correction factor to account for an assumed portion of the load weight carried by the hinges and an assumed distribution of material within the bed,
measuring the total weight of the truck and its load and deducting the tare weight of the truck without its load to determine the actual weight of material in the bed,
adjusting the initial correction factor in light of the measured actual load weight to provide an adjusted correction factor for use in the calculating step, and
determining the weight of subsequent truck loads by applying the adjusted correction factor.

7. The method as set forth in claim 6 comprising additionally the steps of:
determining the initial load weights and actual load weights of a plurality of loads, and
adjusting the initial correction factor by taking into account the variation between the plurality of determined first load weights and the plurality of actually measured load weights.

8. The method as set forth in claim 6 wherein:
the application of said initial and said adjusted correction factors is done by an on-board processor carried by said truck.

9. The method according to claim 6 wherein:
said step of extending the tilting cylinders is executed following receipt of each batch of load material and, prior to receipt of the next batch, the tilting cylinders are retracted to isolate them from the shock of each batch of load being dropped into the bed.

10. The method according to claim 6 comprising additionally the step of:
displaying the determined weight of subsequent truck loads in the truck cab during at least a portion of the loading thereof.

11. The method according to claim 10 comprising additionally the step of:
delaying the display of a determined weight of a truck load in the truck cab until the load weight exceeds a pre-selected minimum load weight.

12. The method according to claim 6 comprising additionally the step of:
providing an indication of the approach and reaching of a maximum desired load weight which indication is visible from the exterior of said truck, whereby it may be viewed by the operator of a loader loading material into said truck.

13. The method of determining the weight of a load of material carried in the bed of a tilting bed truck of the type having its bed pivotally attached to the truck frame by a hinge and controlled by tilting cylinders, said method comprising the steps of:
loading the truck with a material to be hauled,
extending the tilting cylinders a known first amount to a first position sufficient to support the truck bed on the tilting cylinders and hinge and free of direct support by the truck frame,
measuring the pressure of the hydraulic fluid within the tilting cylinders at said first position,
supplying an indication of the measured pressure at the first position to a processor,
calculating, with the processor, a first load weight of the material in the truck bed by utilizing the measured pressure of fluid in the tilting cylinders at the first position and an initial correction factor to account for an assumed portion of the load weight carried by the hinges and an assumed distribution of material within the bed,
extending the tilting cylinders a known additional amount to a second position,
measuring the pressure of the hydraulic fluid within the tilting cylinders at the second position,
calculating, with the processor, a second load weight by utilizing the measured pressure of the fluid in the cylinders at the second position and the initial correction factor,
utilizing the first and second calculated load weights, together with the known geometric relationships between the truck bed, tilting cylinders and hinge at said first and second positions of said cylinders, to calculate a corrected distribution of load in the truck bed,
adjusting the initial correction factor in light of said corrected distribution of load in the truck bed,
utilizing the corrected distribution of load to adjust the initial correction factor, and
calculating a corrected load weight of material in the truck bed by applying the adjusted correction factor.

14. The method according to claim 13 wherein:
the application of said initial and said adjusted correction factors is done by an on-board processor carried by said truck.

15. The method according to claim 13 wherein:
said steps of extending the tilting cylinders to the first and second positions is executed following receipt of each batch of load material and, prior to receipt of the next batch, the tilting cylinders are retracted to isolate them from the shock of each batch of load being dropped into the bed.

16. The method according to claim 13 comprising additionally the step of:

displaying in the truck cab the determined weight of each truck load during at least a portion of the loading thereof.

17. The method according to claim 16 comprising additionally the step of:

delaying the display of a determined weight of a truck load in the truck cab until the load weight exceeds a pre-selected minimum load weight.

18. The method according to claim 13 comprising additionally the step of:

providing an indication of the approach and reaching of a maximum desired load weight which indication is visible from the exterior of said truck whereby it may be viewed by the operator of a loading material into said truck.

* * * * *